US011781015B2

(12) United States Patent
Habraken et al.

(10) Patent No.: US 11,781,015 B2
(45) Date of Patent: Oct. 10, 2023

(54) HEAT RESISTANT POLYAMIDE COMPOSITION

(71) Applicant: BASF SE, Lugwigshafen am Rhein (DE)

(72) Inventors: Gijsbrecht Jacobus Maria Habraken, Ludwigshafen (DE); Patrick Spies, Limburgerhof (DE)

(73) Assignee: BASF SE, Ludwigshafen am Rhein (DE)

( * ) Notice: Subject to any disclaimer, the term of this patent is extended or adjusted under 35 U.S.C. 154(b) by 25 days.

(21) Appl. No.: 16/649,124

(22) PCT Filed: Sep. 20, 2018

(86) PCT No.: PCT/EP2018/075531
§ 371 (c)(1),
(2) Date: Mar. 19, 2020

(87) PCT Pub. No.: WO2019/057849
PCT Pub. Date: Mar. 28, 2019

(65) Prior Publication Data
US 2020/0291230 A1 Sep. 17, 2020

Related U.S. Application Data

(60) Provisional application No. 62/560,966, filed on Sep. 20, 2017.

(51) Int. Cl.
| | | |
|---|---|---|
| C08L 77/08 | (2006.01) | |
| C08K 3/04 | (2006.01) | |
| C08K 5/17 | (2006.01) | |
| C08L 23/06 | (2006.01) | |
| C08L 23/12 | (2006.01) | |
| C08L 23/18 | (2006.01) | |
| C08L 51/06 | (2006.01) | |
| C08L 77/02 | (2006.01) | |

(52) U.S. Cl.
CPC ............... *C08L 77/08* (2013.01); *C08K 3/04* (2013.01); *C08K 5/17* (2013.01); *C08L 23/06* (2013.01); *C08L 23/12* (2013.01); *C08L 23/18* (2013.01); *C08L 51/06* (2013.01); *C08L 77/02* (2013.01); *C08L 2201/08* (2013.01)

(58) Field of Classification Search
CPC .......... C08L 77/02; C08L 77/08; C08L 51/06; C08L 23/06; C08L 23/12; C08L 23/18; C08L 2201/08; C08K 3/04; C08K 5/17
See application file for complete search history.

(56) References Cited

U.S. PATENT DOCUMENTS

| | | | | |
|---|---|---|---|---|
| 3,738,950 A * | 6/1973 | Sturwold et al. | ...... | C08G 69/34 528/341 |
| 4,212,777 A * | 7/1980 | Goletto | .................. | C08G 69/36 528/289 |
| 4,346,024 A * | 8/1982 | Coquard | .................. | C08L 77/12 525/425 |
| 4,977,213 A | 12/1990 | Giroud-Abel et al. | | |
| 5,258,353 A * | 11/1993 | MacDonald | ......... | B41M 5/5272 503/227 |
| 9,546,266 B2 * | 1/2017 | Hanley | .................... | C08L 77/06 |
| 2016/0222196 A1 * | 8/2016 | Kawamura | .......... | C08G 69/265 |

FOREIGN PATENT DOCUMENTS

| | | |
|---|---|---|
| JP | S59-59745 A | 5/1984 |
| JP | H05-177694 A | 7/1993 |
| JP | 2006-192743 A | 7/2006 |

OTHER PUBLICATIONS

Bibliographic data for FR2407227, accessed from Espacenet on Apr. 7, 2022.*
English-language machine translation of JP2006192743, performed on Espacenet on Aug. 16, 2022.*
First Examination Report from corresponding Indian Patent Application No. 202027014809 dated Sep. 30, 2021.
International Preliminary Report on Patentability from counterpart International Application No. PCT/EP2018/075531 dated Apr. 2, 2020.
International Search Report and Written Opinion from counterpart International Application No. PCT/EP2018/075531 dated Jan. 8, 2019.
Office Action from corresponding Brazilian Patent Application No. BR112020005633-2 dated Jul. 26, 2022.
First Office Action from corresponding Chinese Patent Application No. 201880068899.7 dated Aug. 3, 2022, and its English translation.
Office Action from corresponding Japanese Patent Application No. 2020-516824 dated Oct. 11, 2022, and its English translation.
Office Action from corresponding Chinese Patent Application No. 201880068899.7 dated Jan. 18, 2023, and a machine generated English translation.
Technical Examination Report dated Apr. 18, 2023, of counterpart Brazilian Patent Application No. 11 2020 005633-2.
Rejection Decision dated Apr. 18, 2023, of counterpart Chinese Patent Application No. 201880068899.7, along with an English machine translation.
Request for the Submission of an Opinion dated May 30, 2023, of counterpart Korean Patent Application No. 10-2020-7011296, along with an English translation.

* cited by examiner

*Primary Examiner* — Angela C Scott
(74) *Attorney, Agent, or Firm* — DLA Piper LLP (US)

(57) ABSTRACT

A heat-resistant polyamide composition includes a copolyamide and an anhydride-functional polymer. The copolyamide includes the reaction product of at least one lactam and a monomer mixture. The monomer mixture includes at least one $C_{32}$-$C_{40}$ dimer acid, and at least one $C_4$-$C_{12}$-diamine.

16 Claims, No Drawings

HEAT RESISTANT POLYAMIDE COMPOSITION

FIELD OF THE DISCLOSURE

This disclosure generally relates to a heat-resistant polyamide composition, a method of forming a heat-resistant polyamide material with the composition, and the heat-resistant polyamide material.

BACKGROUND

Although polyamides have many desirable physical properties, many polyamides also have physical properties that render them unsuitable for use in certain applications. For example, polyamides may exhibit insufficient physical properties such as low tensile strength and elongation at break, especially during and after exposure to higher temperatures. To this end, some articles comprising polyamide may have insufficient tensile strength, flexibility, and abrasion resistance, e.g., an inability to withstand mechanical action such as stress, rubbing, scraping, and impacts at higher temperatures. Some articles comprising polyamide simply do not maintain their physical properties after exposure to higher temperatures. Accordingly, there remains an opportunity for improvement.

SUMMARY OF THE DISCLOSURE

This disclosure provides a heat-resistant polyamide composition. The heat-resistant polyamide composition includes a copolyamide and an anhydride-functional polymer. The copolyamide includes the reaction product of at least one lactam and a monomer mixture. The monomer mixture includes at least one $C_{32}$-$C_{40}$ dimer acid, and at least one $C_4$-$C_{12}$-diamine.

This disclosure also provides a heat-resistant polyamide material including the reaction product of the copolyamide and the anhydride-functional polymer. A method of forming the heat-resistant polyamide material with the composition includes the step of reacting the copolyamide and the anhydride-functional polymer. The heat-resistant polyamide material has a low elastic modulus yet retains its elastic modulus and elongation properties after aging at elevated temperature (e.g. aging for 3000 hours at 150° C.).

DETAILED DESCRIPTION OF THE DISCLOSURE

This disclosure provides a heat-resistant polyamide composition. The heat-resistant polyamide composition is hereinafter described as the "composition." The composition includes (A) a copolyamide and (B) an anhydride-functional polymer.

Copolyamide (A)

The terms "copolyamide (A)" and "at least one copolyamide (A)" may be used interchangeably throughout this disclosure and it is to be appreciated that, unless otherwise specified, both "copolyamide (A)" and "at least one copolyamide (A)" can mean exactly one copolyamide as well as a mixture of two or more copolyamides.

The copolyamide (A) includes the reaction product of (i) at least one lactam and (ii) a monomer mixture. The monomer mixture (ii) includes (a) at least one $C_{32}$-$C_{40}$ dimer acid, and (b) at least one $C_4$-$C_{12}$-diamine. In many embodiments, the reaction product includes from 15 to 84% by weight of the at least one lactam (i), and from 16 to 85% by weight of the monomer mixture (ii), wherein the % by weight of components (i) and (ii) is based on the total weight of components (i) and (ii) in the composition.

The terms "component (i)", "at least one lactam (i)", and "lactam (i), are used synonymously within this disclosure and therefore have the same meaning. The same applies to the terms "component (ii)" and "monomer mixture (ii)". These terms are also used synonymously within the scope of the present invention and therefore have the same meaning.

In many embodiments, the copolyamide (A) is prepared by polymerizing from 15 to 84% by weight of component (i) and from 16 to 85% by weight of component (ii), preferably the copolyamide (A) is prepared by polymerizing from 40 to 83% by weight of the component (i) and from 20 to 40% by weight of component (ii), wherein the % by weight of components (i) and (ii) is based on the total weight of components (i) and (ii) in the composition. It is to be appreciated that the weight percentages of components (i) and (ii) are based on the weight percent of components (i) and (ii) before the polymerization, that is, when the components (i) and (ii) have reacted. During polymerization, the weight ratio of the components (i) and (ii) may change.

As is set forth above, the copolyamide (A) is prepared by polymerizing the components (i) and (ii). In many embodiments, the polymerization of components (i) and (ii) is a condensation reaction. Condensation reactions are known to those skilled in the art. During the condensation reaction, the component (i) reacts with the components (a) and (b) included in the component (ii), and, if appropriate, with the component (c) described further below, which may also be present in the component (ii). Amide bonds form between the individual components. Usually, the component (i) is an at least partially open-chain, i.e., as an amino acid, during the polymerization.

The polymerization of components (i) and (ii) can take place in the presence of a catalyst. Suitable catalysts include all catalysts known to those skilled in the art which catalyze the polymerization of components (i) and (ii). For example, suitable catalysts include, but are not limited to, sodium hypophosphite, phosphorous acid, triphenylphosphine or triphenylphosphite.

Components (i) and (ii) are polymerized to yield the copolyamide (A). That is, the copolyamide (A) is the reaction product of components (i) and (ii). As such, the copolyamide (A) includes structural units derived from component (i), and structural units derived from component (ii). Of course, structural units derived from component (ii) include structural units derived from components (a), (b), (c), and combinations thereof.

In some embodiments, the copolymer is a random copolymer. In a random copolymer, structural units derived from the component (i) are replaced by structural units derived from the component (ii). This variation takes place statistically. For example, two structural units derived from component (ii) can be followed by a structural unit which is derived from component (i), which in turn can be followed by a structural unit of component (ii), followed by a structural unit including three structural units derived from the component (i), etc. In a preferred embodiment, the at least one copolyamide (A) is a random copolymer.

In other embodiments, the copolymer is a block copolymer. A block copolymer includes blocks of structural units derived from component (ii) and blocks of structural units derived from component (i).

In one embodiment, the preparation of the copolyamide (A) includes the steps of:
(1) polymerizing the components (i) and (ii) to obtain a first copolyamide;
(2) granulating the first copolyamide obtained in step (1);
(3) extracting the first copolyamide with water to obtain at an extracted copolyamide; and
(4) drying the extracted copolyamide obtained in step (3) at a temperature (T) to yield the copolyamide (A).

In another embodiment, the preparation of the copolyamide (A) includes the steps of:
(1) polymerizing the components (i) and (ii) to obtain at least one first copolyamide;
(2) granulating the copolyamide in the process step (1);
(3) extracting the at least one granulated copolyamide obtained in step (2) with water to obtain at least one extracted copolyamide;
(4) drying the at least one extracted copolyamide obtained in step (3) at a temperature (T) to yield the copolyamide (A).

The polymerization in step (1) can take place in any reactor known to those of skill in the art. In one embodiment, components (i) and (ii) are polymerized in a stirred tank reactor.

In step (2), the first copolyamide obtained in step (1) can be granulated via any method known to those of skill in the art. In one embodiment, the first copolyamide is granulated (e.g., pelletized) via strand pelletization or underwater pelletizing.

The extraction in step (3) can be carried out by all methods known to those of skill in the art. In the extraction in step (3), secondary products formed during the polymerization of components (i) and (ii) in step (1) are extracted from the granulated copolyamide.

In step (4), the extracted copolyamide obtained in step (3) is dried. Methods for drying are known to those of skill in the art. The extracted copolyamide is dried at a temperature (T). In many embodiments, the temperature (T) is preferably above the glass transition temperature ($T_g$) of the copolyamide and below the melting temperature ($T_m$) of the copolyamide. For example, in some embodiments, the temperature (T) is below the melting temperature in a range of from about 40 to about 50, °C. In many embodiments, drying in step (4) conducted for a period in the range of from about 1 to about 100, from about 2 to about 50, or from about 3 to about 40, hours. Without being bound by theory, it is believed that the molecular weight of the copolyamide (A) is increased by the drying in step (4).

In many embodiments, the copolyamide (A) is dry. For the purposes of the present invention, "dry" means that the at least one copolyamide (A) includes less than about 1, less than about 0.5, or less than about 0.1, % water by weight, based on the total weight of the copolyamide (A). In a preferred embodiment, "dry" means that the at least one copolyamide (A) does not include water, and most preferably the at least one copolyamide (A) includes no solvent.

In many embodiments, the copolyamide (A) has a $T_g$ of from about 20 to about 50, from about 23 to about 47, or from about 25 to about 45, ° C., as determined according to ISO 11357-2: 2014.

In many embodiments, the copolyamide (A) has a $T_m$ of from about 150 to about 210, from about 160 to about 205, from about 150 to about 200, ° C. as determined according to ISO 11357-3:2014.

In many embodiments, the copolyamide (A) has a viscosity number of from about 160 to about 290, from about 170 to about 280, ml/g, as determined in a 0.5% strength by weight solution of the copolyamide (A) in a 1:1 weight ratio of phenol:o-dichlorobenzene.

In some embodiments, the copolyamide (A) is further defined as a copolyamide of polyamide 6 and polyamide 6.36. In some such embodiments, it is preferred that the polyamide 6.36 is present in copolyamide (A) in an amount of from about 8 to about 45% by weight based on a total weight of said copolyamide (A).

In many embodiments, the copolyamide (A) is present in the composition in an amount of from about 40 to about 95, from about 45 to about 90, or from about 50 to about 80, % by weight based on a total weight of the composition. In additional non-limiting embodiments, all values and ranges of values, both whole and fractional, within one or more of the aforementioned ranges, are hereby expressly contemplated. Further, it is to be appreciated that more than one type of the copolyamide (A) may be included in the composition, in which case the total amount of all the copolyamide (A) present in the composition is within the above ranges.

Lactam (i)

As is set forth above, the copolyamide (A) includes the reaction product of (i) at least one lactam and (ii) a monomer mixture. In the context of this disclosure, "the lactam (i)", "the at least one lactam (i)", and component (i) are used interchangeably, and it is to be appreciated that these terms can refer to one lactam or a mixture of two or more lactams (i.e., one or more lactams). In a typical embodiment, one lactam (i) is used.

Component (i) is at least one lactam (i). Lactams (i) are known to those skilled in the art. In many embodiments, lactams (i) having 4 to 12 carbon atoms are preferred. That is, the at least one lactam (i) is a $C_4$-$C_{12}$ lactam (i). Within the scope of the present disclosure, the term "lactam (i)" refers to a cyclic amide having from 4 to 12, or 5 to 8, carbon atoms in its ring. Suitable lactams (i) are, for example, selected from the group consisting of 3 aminopropanoic acid lactam (propio 3 lactam, β lactam, β-propiolactam), 4 aminobutanoic acid lactam (butyro-4-lactam, γ-lactam, γ butyrolactam), aminopentanoic acid lactam (2-piperidinone; (Lactam, ε-caprolactam), 7-aminoheptanoic acid lactam (heptano-7-lactam, ζ lactam, ζ-heptanolactam), 8-aminooctanoic acid lactam (octano-8-lactam; Lactam, η-octanolactam), 9 aminononanoic acid lactam (nonano-9-lactam, θ lactam, nonanolactam), 10 aminodecanoic acid lactam (decano-10-lactam; ω-decanolactam), 11 aminoundekanoic acid lactam (undecano-11-lactam; ω undecanolactam), and 12 aminododecanoic acid lactam (dodecano-12-lactam, ω dodecanolactam). In some embodiments, the lactam (i) is unsubstituted. In other embodiments, the lactam (i) is substituted. If at least a substituted lactam (i) is used, it can carry one, two or more substituents on the nitrogen atom and/or on the carbon atoms of the ring which are selected independently of one another from the group consisting of a $C_1$ to $C_{10}$ alkyl, a $C_5$ to $C_6$ cycloalkyl, and a $C_5$ to $C_{10}$ aryl. Suitable $C_1$ to $C_{10}$ alkyl substituents are, for example, methyl, ethyl, propyl, isopropyl, n-butyl, sec-butyl and tert-butyl. A suitable $C_5$ to $C_6$ cycloalkyl substituent is, for example, cyclohexyl. Preferred $C_5$ to $C_{10}$ aryl substituents are phenyl and anthranyl. In a preferred embodiment, an unsubstituted lactam (i) is used. In such embodiments, γ-lactam (γ-butyrolactam), δ-lactam (δ-valerolactam) and ε-lactam (ε-caprolactam) can be used. In a preferred embodiment, the at least one lactam (i) is selected from δ-lactam, ε-lactam, and combinations thereof. In one embodiment, the at least one lactam is ε-lactam (ε-caprolactam).

Monomer Mixture (ii)

The copolyamide (A) includes the reaction product of (i) at least one lactam and (ii) a monomer mixture. The monomer mixture (ii) includes (a) at least one $C_{32}$-$C_{40}$ dimer acid, and (b) at least one $C_4$-$C_{12}$-diamine. For the purposes of the present disclosure "the dimer acid (a)", "at least one $C_{32}$-$C_{40}$-dimer acid (a)", and "component (a)" are used synonymously, and it is to be appreciated that these terms can refer to one $C_{32}$-$C_{40}$-dimer acid or a mixture of two or more $C_{32}$-$C_{40}$-dimer acids (i.e., one or more lactams). Likewise, for the purposes of the present disclosure "the $C_4$-$C_{12}$-diamine (b)", "at least one $C_4$-$C_{12}$-diamine (b)", and "component (b)" are used synonymously, and it is to be appreciated that these terms can refer to one $C_{32}$-$C_{40}$-dimer acid or a mixture of two or more $C_{32}$-$C_{40}$-dimer acids (i.e., one or more lactams).

In many embodiments, the monomer mixture (ii) includes from about 45 to about 55 mol % of component (a), and from about 45 to about 55 mol % of component (b), based in each case on the sum of the molar percentages of components (a) and (b) or on the total quantity of component (ii). In some embodiments, the monomer mixture (ii) includes from about 47 to about 53 mol % of component (a), and from about 47 to about 53 mol % of component (b) based in each case on the sum of the molar percentages of components (a) and (b) or on the total quantity of component (ii). In some preferred embodiments, the monomer mixture (ii) includes from about 49 to about 51 mol % of component (a), and from about 49 to about 51 mol % of component (b), based in each case on the sum of the molar percentages of components (a) and (b) or on the total quantity of component (ii).

Component (ii) can additionally include a component (c), an at least one $C_4$-$C_{20}$ diacid. Of course, for the purposes of the present disclosure "the $C_4$-$C_{20}$ diacid (c)", "the at least one $C_4$-$C_{20}$ diacid (c)", and "component (c)" are used synonymously, and it is to be appreciated that these terms can refer to one diacid or a mixture of two or more diacids (i.e., one or more diacids). In many embodiments, the monomer mixture (ii) includes component (a) in an amount of from about 25 to about 54.9 mol %, component (b) in an amount of from about 45 to about 55 mol %, and component (c) in an amount of from about 0.1 to about 25 mol %, based in each case on the sum of the molar percentages of components (a), (b), and (c) or on the total quantity of component (ii). In some embodiments, the monomer mixture (ii) includes from about 13 to about 52.9 mol % of the component (a), from about 47 to about 53 mol % of the component (b), and from about 0.1 to about 13 mol % of the component (c), based in each case on the sum of the molar percentages of components (a), (b), and (c) or on the total quantity of component (ii). In other embodiments, the monomer mixture (ii) includes from about 7 to about 50.9 mol % of the component (a), from about 49 to about 51 mol % of the component (b), and from about 0.1 to about 7 mol % of the component (c), based in each case on the sum of the molar percentages of components (a), (b), and (c) or on the total quantity of component (ii). If the component (ii) additionally includes the component (c), the sums of the weight percentages of the components (a), (b) and (c) usually add up to 100% by weight. The monomer mixture (ii), the components (a) and (b) and optionally (c) of component (ii) can react with one another to give amides. This reaction is known to those skilled in the art. As such, component (ii) may include the components (a) and (b), and optionally (c), in fully reacted form, partially reacted form, or unreacted form. Component (ii) preferably includes components (a) and (b) and, if desired, (c) in unreacted form. In the context of the present disclosure, "in the unreacted form" means that the component (a) is present as the at least one $C_{32}$-$C_{40}$ dimeric acid and the component (b) is present as the at least one $C_4$-$C_{12}$ diamine and optionally the component (c) as the at least one $C_4$-$C_{20}$ diacid. If the components (a) and (b) and, if appropriate, (c) react at least partially, the components (a) and (b) and (c) are at least partially an amide.

$C_{32}$-$C_{40}$-Dimer Acid (a)

According to the disclosure, component (a) is at least one $C_{32}$-$C_{40}$-dimer acid. "At least one $C_{32}$-$C_{40}$-dimer acid" in the context of the present disclosure means exactly one $C_{32}$-$C_{40}$ dimer acid as well as a mixture of two or more $C_{32}$-$C_{40}$ dimer acids. Dimer acids are also known in the art as dimer fatty acids. $C_{32}$-$C_{40}$ dimer acids are known in the art and are typically prepared by dimerization of unsaturated fatty acids. This dimerization can, for example, be catalyzed by means of clays. Suitable unsaturated fatty acids for the preparation of the at least one $C_{32}$-$C_{40}$ dimer acid are known to the person skilled in the art and are, for example, unsaturated $C_{16}$-fatty acids, unsaturated $C_{18}$-fatty acids and unsaturated $C_{20}$-fatty acids. In many embodiments, component (a) is prepared from unsaturated fatty acids from the group consisting of unsaturated $C_{16}$-fatty acids, unsaturated $C_{18}$-fatty acids and unsaturated $C_{20}$-fatty acids, where the unsaturated $C_{18}$-fatty acids are particularly preferred. That is, in a preferred embodiment, component (a) is prepared from an unsaturated $C_{18}$ fatty acid.

A suitable, non-limiting example of an unsaturated $C_{16}$ fatty acid is, for example, palmitoleic acid ((9Z) hexadeca 9-enoic acid).

Suitable, non-limiting examples of unsaturated $C_{18}$ fatty acids are petroselic acid ((6Z)-Octadec-6-enoic acid), oleic acid ((9Z)-Octadec-9-enoic acid), elaidic acid ((E)-octadec-9-enoic acid), vaccenic acid ((E)-Octadec-11-enoic acid), linoleic acid ((9Z,12Z)-9,12-Octadecadienoic acid), Gamma-linolenic acid ((6Z,9Z,12Z)-octadeca-6,9,12-trienoic acid), calendulic acid ((8E,10E,12Z)-Octadeca-8,10,12-trienoic acid), punicic acid (9Z,11E,13Z)-octadeca-9,11,13-trienoic acid), alpha-elaeostearin acid ((9E,11E,13E)-octadeca-9,11,13-trienoic acid), and beta-elaeostearic acid ((9E,11E,13E)-Octadeca-9,11,13-trienoic acid).

In some embodiments, the $C_{18}$ fatty acid is selected from: petroselic acid ((6Z)-Octadec-6-enoic acid), oleic acid ((9Z)-Octadec-9-enoic acid), elaidic acid ((E)-octadec-9-enoic acid), vaccenic acid ((E)-Octadec-11-enoic acid), linoleic acid ((9Z,12Z)-9,12-Octadecadienoic acid), and combinations thereof. In some embodiments, the $C_{20}$ fatty acid is selected from gadoleic acid ((9Z)-9-Icosenoic acid), icosenoic acid ((11Z)-eicosa-11oic acid), arachidonic acid ((5Z, 8Z, 11Z, 14Z)-11,14-tetraenoic acid), and timnodonic acid ((5Z, 8Z, 11Z, 14Z, 17Z)-eicosa-5,8,11,14,17-pentenenoic acid). Component (a) is particularly preferably at least one $C_{36}$-dimer acid. The at least one $C_{36}$-dimer acid is preferably prepared from $C_{18}$-unsaturated fatty acids. More preferably, the $C_{36}$-dimer acid is prepared from $C_{18}$ fatty acids selected from the group consisting of petroselic acid (6Z)-octadeca-6-enoic acid, oleic acid (9Z) octadeca 9oic acid), elaidic acid ((9E) 9-enoic acid), vaccenoic acid ((11E)-octadeca-11-enoic acid), and linoleic acid ((9Z, 12Z)-octadeca-9,12-dienoic acid). That is, in a preferred embodiment, the unsaturated $C_{18}$ fatty acid is selected from petroselic acid, oleic acid, elaidic acid, vaccenic acid, linoleic acid, and combinations thereof.

In the preparation of component (a) from unsaturated fatty acids, trimer acids can also be formed, and residues of unreacted unsaturated fatty acid can remain. In some embodiments, component (a) includes: at most about 0.5% by weight of unreacted unsaturated fatty acid and at most about 0.5% by weight of trimer acid; or at most about 0.2% by weight, unreacted unsaturated fatty acid and at most about 0.2% by weight of trimer acid, with % by weight based in each case on the total weight of component (a).

Suitable dimeric acids (also known in the art as dimerized fatty acids or dimeric fatty acids) are mixtures which are produced by the oligomerization of unsaturated fatty acids, in particular in the context of the present disclosure. They can be prepared, for example, by catalytic dimerization of vegetable, unsaturated fatty acids, the starting materials being in particular unsaturated $C_{16}$-$C_{20}$ fatty acids. The linkage is mainly based on the Diels-Alder type and, depending on the number and position of the double bonds of the fatty acids used for the preparation of the dimeric acids, mixtures of predominantly dimeric products which include cycloaliphatic, linear-aliphatic, branched aliphatic and also $C_6$ aromatic hydrocarbon groups. Depending on the mechanism and/or, if appropriate, subsequent hydrogenation, the aliphatic radicals can be saturated or unsaturated and the proportion of aromatic groups can also vary. The radicals between the carboxylic acid groups then include, for example, 32 to 40 carbon atoms. For the production, fatty acids with 18 carbon atoms are preferably used so that the dimeric product thus has 36 carbon atoms. The radicals which connect the carboxyl groups of the dimer fatty acids preferably have no unsaturated bonds and no aromatic hydrocarbon radicals.

For the purposes of the present disclosure, preference is therefore given to using $C_{18}$-fatty acids in the preparation of component (a). In many preferred embodiments, the $C_{18}$-fatty acid is selected from linolenic acid, oleic acid, and combinations thereof. Depending on the reaction regime, mixtures which mainly include dimeric but also trimeric molecules as well as monomeric molecules and other byproducts are formed in the abovementioned oligomerization. The process is usually purified by distillation. Commercially available dimer acids typically include at least about 80% by weight of dimeric molecules, up to about 19% by weight of trimeric molecules, and a maximum of about 1% by weight of monomeric molecules and other by-products. In many embodiments, the dimer acids used include at least about 90, at least about 95, or at least about 98, % by weight, of dimeric fatty acid molecules. The proportions of monomeric, dimeric and trimeric molecules and other byproducts in the dimeric acids can be determined, for example, by gas chromatography (GC) respectively. The dimeric acids are converted into the corresponding methyl esters by the boron trifluoride method (compare DIN EN ISO 5509) before GC analysis and then analyzed by means of GC. The basic characteristic for "dimeric acids" thus applies to the preparation thereof, which is preferably at least 80% by weight, more preferably at least 90% by weight, most preferably at least 95% by weight and in particular at least 98% by weight. In the oligomerization, therefore, predominantly dimeric products are formed, which are precisely two-fold, fatty acid molecules, which justifies this already common designation. Accordingly, an alternative expression for the relevant term, "dimeric acids" is "mixture including dimerized fatty acids".

In many embodiments, component (a) has an acid number in the range from about 190 to about 200 mg KOH/g.

Dimeric Acids are commercially available under the trade name of RADIACID® which is commercially available from Oleon, PRIPOL® which is commercially available from Croda, and UNIDYME® which is commercially available from Arizona Chemical.

$C_4$-$C_{12}$-Diamine (b)

According to the disclosure, component (b) is at least one $C_4$-$C_{12}$-diamine. Within the scope of the present disclosure, "at least one $C_4$-$C_{12}$-diamine (b)" means exactly one $C_4$-$C_{12}$-diamine as well as a mixture of two or more $C_4$-$C_{12}$ diamines. In the context of the present disclosure, the $C_4$-$C_{12}$-diamine (b) is understood as meaning aliphatic and/or aromatic compounds having four to twelve carbon atoms and two amino groups (—$NH_2$ groups). The aliphatic and/or aromatic compounds may be unsubstituted or additionally at least monosubstituted. If the aliphatic and/or aromatic compounds are additionally at least monosubstituted, they may bear one, two or more substituents which do not participate in the polymerization of components (i) and (ii). Such substituents are, for example, alkyl or cycloalkyl substituents, and known to those of skill in the art. Component (ii) is, for example, selected from the group of 1,4-diaminobutane (butane-1,4-diamine, tetramethylenediamine, putrescine), 1,5-diaminopentane (Pentamethylenediamine, pentane-1,5-diamine, cadaverine), 1,6-diaminohexane (hexamethylenediamine, hexane-1,6-diamine), 1,7-diaminoheptane, 1,8-diaminooctane, 1,9-diaminononane, Diaminodecane (decamethylenediamine), 1,11 diaminoundekane (undecamethylenediamine), 1,12-diaminododecane (dodecamethylenediamine), and combinations thereof. Component (b) is preferably selected from the group of tetramethylenediamine, pentamethylenediamine, hexamethylenediamine, decamethylenediamine, dodecamethylenediamine, and combinations thereof. To this end, in many preferred embodiments, component (b) is selected from the group of tetramethylenediamine, pentamethylenediamine, hexamethylenediamine, decamethylenediamine, dodecamethylenediamine, and combinations thereof.

$C_4$-$C_{20}$-Diacid (c)

According to the disclosure, component (c) is at least one $C_4$-$C_{20}$-diacid. In the context of the present disclosure, "at least one $C_4$-$C_{20}$-diacid" means exactly one $C_4$-$C_{20}$-diacid as well as a mixture of two or more $C_4$-$C_{20}$ diacids. In the context of the present disclosure, "$C_4$-$C_{20}$-diacid" is understood as meaning aliphatic and/or aromatic compounds having two to eighteen carbon atoms and two carboxy groups (—COOH groups). The aliphatic and/or aromatic compounds may be unsubstituted or additionally at least monosubstituted. If the aliphatic and/or aromatic compounds are additionally at least monosubstituted, they may bear one, two or more substituents which do not participate in the polymerization of components (A) and (B). Such substituents are known to those skilled in the art and include, for example, alkyl or cycloalkyl substituents. Suitable component (c) are, for example, selected from the group consisting of butanedioic acid, pentanedioic acid, hexanedioic acid, heptanedioic acid, octanedioic acid, suberic acid), nonanoic acid (azelaic acid), decanedioic acid (sebacic acid), undecanedioic acid, dodecanedioic acid, tridecanedioic acid, tetradecanedioic acid, and hexadecanedioic acid. In many embodiments, wherein component (c) is included, component (c) is selected from the group of pentanedioic acid, hexanedioic acid, decanedioic acid, dodecanedioic acid, and combinations thereof.

Anhydride-Functional Polymer (B)

As described above, the composition also includes the anhydride-functional polymer (B), which reacts with the polyamide. By "anhydride-functional" copolymer it is meant that the polymer is contacted with an anhydride-functional group, under various conditions, to cause all or part of the functional group to incorporate, graft, bond to, physically attach to, and/or chemically attach to the copolymer. The anhydride-functional group of the anhydride-functional polymer (B) reacts with the amino end groups of the copolyamide (A) to form a reaction product which can be referred to as a heat resistant-polyamide material.

The anhydride-functional polymer (B) can be a copolymer having anhydride-functionality grafted thereon, as is described above. As another example, the anhydride-functional polymer (B) can be the polymerization product of an anhydride-functional moiety. That is, "anhydride-functional" is also defined to include copolymers directly polymerized from monomers comprising olefin monomers and a monomer containing an anhydride-functional group, (or using initiators having a functional group) to produce a copolymer having an anhydride-functional group. As yet another example, the anhydride-functional polymer (B) can be the reaction of an acid anhydride and an α-olefin copolymer in the presence of an organic peroxide.

In various embodiments, the anhydride-functional polymer (B) includes the reaction product of monomers selected from ethylene, propylene, butylene, 1-butene, 1-hexene, 1-octene, 1-decene, 1-dodecene, 1-tetradecene, 1-hexadecene, 1-octadecene, styrene, methyl acrylate, ethyl acrylate, isopropyl acrylate, n-propyl acrylate, n-butyl acrylate, t-butyl acrylate, and combinations thereof.

In some embodiments, the anhydride-functional polymer (B) includes an α-olefin, which can be branched or linear. In one particular embodiment, the anhydride-functional polymer (B) includes a linear α-olefin. In other embodiments, the anhydride-functional polymer (B) includes polyethylene and/or polypropylene.

Examples of anhydride-functional groups include, but are not limited to, maleic anhydride, phthalic anhydride, citraconic anhydride, 2-methyl maleic anhydride, 2-chloromaleic anhydride, 2,3-dimethylmaleic anhydride, bicyclo[2,2,1]-5-heptene-2,3-dicarboxylic anhydride, and 4-methyl-4-cyclohexene-1,2-dicarboxylic anhydride, itaconic anhydride, bicyclo(2.2.2)oct-5-ene-2,3-dicarboxylic acid anhydride, 1,2,3,4,5,8,9,10-octahydronaphthalene-2,3-dicarboxylic acid anhydride, 2-oxa-1,3-diketospiro(4.4)non-7-ene, bicyclo(2.2.1)hept-5-ene-2,3-dicarboxylic acid anhydride, maleopimaric acid anhydride, tetrahydrophthalic anhydride, norborn-5-ene-2,3-dicarboxylic acid anhydride, nadic anhydride, methyl nadic anhydride, himic anhydride, methyl himic anhydride, and x-methyl-bicyclo(2.2.1)hept-5-ene-2,3-dicarboxylic acid anhydride (XMNA).

In a preferred embodiment, the anhydride-functional polymer (B) is a maleic anhydride-functional polymer. In these embodiments, the anhydride-functional polymer (B) can include less than about 50, less than about 40, less than about 30, less than about 20, less than about 10, less than about 5, less than about 4, less than about 3, from about 0.2 to about 50, from about 0.2 to about 40, from about 0.2 to about 30, from about 0.2 to about 20, from about 0.2 to about 10, from about 0.2 to about 5, from about 0.2 to about 2.5, from about 0.2 to about 2, or from about 0.2 to about 1.5, % by weight anhydride (e.g. maleic anhydride) based on a total weight of the anhydride-functional polymer (B).

In various embodiments, the anhydride-functional polymer (B) includes a maleic anhydride modified α-olefin graft copolymer. For example, in some embodiments, the anhydride-functional polymer (B) includes a maleic anhydride modified α-olefin graft copolymer, ethylene-propylene copolymer, an ethylene-butene copolymer, an ethylene-hexene copolymer, and an ethylene-octene copolymer, and combinations thereof. In one embodiment, the anhydride-functional polymer (B) includes an α-olefin graft copolymer comprising the reaction product of ethylene and 1-octene, grafted with units derived from maleic anhydride. In one embodiment, the α-olefin graft copolymer is a copolymer of ethylene and a second α-olefin, and the α-olefin graft copolymer is grafted with an anhydride of an α, β-unsaturated carboxylic acid. In one particular embodiment, the anhydride-functional polymer (B) includes a maleic anhydride modified ethylene-octene copolymer.

In a specific embodiment, the anhydride-functional polymer (B) is formed by grafting maleic anhydride onto a saturated copolymer, typically via extrusion. Maleic anhydride-functional polymers are preferred because of the high reactivity of the maleic anhydride group with the amino group of the polyamide. In one embodiment, the anhydride-functional polymer (B) is a maleic anhydride modified ethylene-octene copolymer. In one embodiment, the maleic anhydride modified ethylene-octene copolymer of this embodiment includes melt-grafted maleic anhydride and is further defined as having a linear molecular structure. In another embodiment, the maleic anhydride modified ethylene-octene copolymer of this embodiment includes melt-grafted maleic anhydride and is further defined as having a branched molecular structure.

In this embodiment, the physical properties, e.g. high temperature performance and high elongation at break, of the base layer 12 can be attributed to (1) good dispersion of the maleic anhydride modified ethylene-octene copolymer, (2) chemical interaction between the maleic anhydride modified ethylene-octene copolymer and the polyamide and (3) the low crystallinity of the maleic anhydride modified ethylene-octene copolymer.

In various embodiments, the anhydride-functional polymer (B) is a maleic anhydride modified ethylene-butene copolymer. In one embodiment, the polyolefin is nano-crystal polypropylene having a crystal size of about 50 nm. In this embodiment, the nano-crystal polypropylene has a tensile strength at break of about 19 MPa (or greater than 19 MPa) and an elongation at break of about 100% (or greater than 100%) when tested in accordance with ASTM D38. The nano-crystal polypropylene of this embodiment has a melting point of about 160° C. and becomes brittle at about −28° C.

In many embodiments, the anhydride-functional polymer (B) is present in the composition in an amount of from about 5 to about 60, from about 10 to about 45, or from about 15 to about 40, % by weight based on a total weight of the composition. In additional non-limiting embodiments, all values and ranges of values, both whole and fractional, within one or more of the aforementioned ranges, are hereby expressly contemplated. Further, it is to be appreciated that more than one type of anhydride-functional polymer (B) may be included in the composition, in which case the total amount of all anhydride-functional polymer (B) present in the composition is within the above ranges.

Heat Stabilizing Component (C)

The composition may optionally include a heat stabilizing component (C) comprising a metal salt, a carbon black, a hindered amine, a phenolic, a phosphite, and combinations thereof. For example, in various embodiments, the heat stabilizing component (C) may be chosen from carbon black, cuprous iodide, potassium iodide, potassium bromide, diphenyl amine, hindered phenol, phosphite and combinations thereof. In many embodiments, the heat stabilizing component (C) includes a metal salt, a carbon black, a hindered amine, and combinations thereof.

In some embodiments, the heat stabilizing component (C) includes carbon black. In other embodiments, the heat stabilizing component (C) includes an inorganic salt. Examples of suitable inorganic salts include, but are not limited to, alkali, alkaline earth and transition metal halides, sulphates, nitrates, carbonates, carboxylates, sulphites and phosphates, such as sodium chloride, potassium bromide, potassium iodide, calcium carbonate, magnesium sulphate, cupric nitrate, cupric iodide, cupric acetate, and mixtures thereof. Suitable acidifying components are, for example, sodium-phosphor buffers, such as sodium pyrophosphate, like disodiumdihydrogenpyrophosphate.

Non-limiting examples of suitable metal salts are for example, nickel dithiocarbamates, zinc dithiocarbamates, and copper salts. In a preferred embodiment, the heat stabilizing component (C) includes a copper salt.

In some such preferred embodiments, the copper salt is a copper halogenide/alkalihalogenide combination. Suitable halogenides include chloride, bromide and iodide; suitable alkali ions include sodium and potassium. A suitable copper halogenide/alkalihalogenide combination is, for example, CuI/KI.

When included, the heat stabilizing component (C) is present in the composition in an amount of from about 0.1 to about 4, from about 0.15 to about 3, or from about 0.2 to about 2, % by weight based on a total weight of the composition. In additional non-limiting embodiments, all values and ranges of values, both whole and fractional, within one or more of the aforementioned ranges, are hereby expressly contemplated.

Supplemental Polyamide (D)

The composition may also include a supplemental polyamide (D), which is different than copolyamide (A). The supplemental polyamide (D) can be further defined as a polymer that is linked together through peptide bonds and that is formed from a polymerization reaction of amide monomers. The supplemental polyamide (D) may be, include, consist essentially of, or consist of, a homopolymer (e.g. nylon 6), a co-polymer (e.g. nylon 6,6), a terpolymer (e.g. nylon 6/66), or any other higher polymer that is formed from more than three or more different monomers.

In some embodiments, the supplemental polyamide (D) may be, include, consist essentially of, or consist of, one or more of polyamides following the description: X.Y, Z or X.Y/Z, of which X is from a diamine, Y is provided by a diacid and Z is provided by an amino acid or lactam. X: diamine with a linear or branched structure containing from 2 to 40 aliphatic carbon atoms. Y: diacid with a linear, branched or cyclic structure containing from 2 to 40 aliphatic carbon atoms. X and/or Y could contain non-aliphatic carbon structures, such as phenyl groups. Z: an amino acid or lactam with a linear, branched or cyclic structure containing from 2 to 40 carbon atoms. Examples thereof are: polyamide 6, polyamide 6,6, polyamide 6/66, poly(4-aminobutyric acid) (nylon 4), poly(7-aminoheptanoic acid) (nylon 7), poly(8-aminooctanoic acid)(nylon 8), poly(9-aminononanoic acid) (nylon 9), poly(10-aminodecanoic acid) (nylon 10), poly(11-aminoundecanoic acid) (nylon 11), poly(12-aminododecanoic acid) (nylon 12), nylon 4,6, poly(hexamethylene sebacamide) (nylon 6,10), poly(heptamethylene pimelamide) (nylon 7,7), poly(octamethylene suberamide) (nylon 8,8), poly(hexamethylene azelamide) (nylon 6,9), poly(nonamethylene azelamide) (nylon 9,9), poly(decamethylene azelamide) (nylon 10,9), poly(tetramethylenediamine-co-oxalic acid) (nylon 4,2), the polyamide of n-dodecanedioic acid and hexamethylenediamine (nylon 6,12), the polyamide of dodecamethylenediamine and n-dodecanedioic acid (nylon 12,12), trimethylene adipamide/hexamethylene azelaiamide copolymer (nylon trimethyl 6,2/6,2), hexamethylene adipamide-hexamethylene-azelaiamide caprolactam copolymer (nylon 6,6/6,9/6), poly(tetramethylenediamine-co-isophthalic acid) (nylon 4,I), polyhexamethylene isophthalamide (nylon 6,I), hexamethylene adipamide/hexamethylene-isophthalamide (nylon 6,6/6I), hexamethylene adipamide/hexamethyleneterephthalamide (nylon 6,6/6T), poly (2,2,2-trimethylhexamethylene terephthalamide), poly(m-xylylene adipamide) (MXD6), poly(p-xylylene adipamide), poly(hexamethylene terephthalamide), poly(dodecamethylene terephthalamide), polyamide 6T/6I, polyamide 6/MXDT/I, polyamide MXDI, a terpolymer of lauryl lactam, isophthalic acid and bis(4-amino-3-methylcyclohexyl)methane and polynorbornamide, and combinations thereof.

In some preferred embodiments, the supplemental polyamide (D) is selected from polyamide 6, polyamide 6,6, polyamide 6/10, polyamide 6/66, and combinations thereof.

In other embodiments, the supplemental polyamide (D) is chosen from polyamide 6, polyamide 6,6, polyamide 6/66, polyamide 12, polyamide 11, polyamide 6/10, polyamide 6/6.36, polyamide 6I/6T, and combinations thereof. In one embodiment, the supplemental polyamide (D) is further defined as polyamide 6. In another embodiment, the supplemental polyamide (D) is further defined as polyamide 6,6. In yet another embodiment, the supplemental polyamide (D) is further defined as polyamide 6,10. Suitable supplemental polyamides (D) are commercially available from BASF Corporation under the trade name ULTRAMID®.

Like the copolyamide (A), the supplemental polyamide (D) may include water, i.e., moisture. For example, the supplemental polyamide (D) may include less than 1%, less than 0.75%, from about 0.2 to about 0.5%, or from about 0.05 to about 0.5%, by weight of moisture. However, it is contemplated that the supplemental polyamide (D) may include any amount of moisture, as selected by one of skill in the art.

If present, in many embodiments, the supplemental polyamide (D) is present in the composition in an amount of from about 1 to about 99, from about 5 to about 80, or from about 10 to about 60, % by weight based on a total weight of the composition. In additional non-limiting embodiments, all values and ranges of values, both whole and fractional, within one or more of the aforementioned ranges, are hereby expressly contemplated. Further, it is to be appreciated that more than one type of supplemental polyamide (D) may be included in the composition, in which case the total amount of all supplemental polyamide (D) present in the composition is within the above ranges.

Additives and Fillers

The composition may also include one or more additives. The additives are not particularly limited and may be any known in the art. The one or more additives may be selected from the group of oxidative and thermal stabilizers, release agents, flame-retarding agents, oxidation inhibitors, oxidation scavengers, neutralizers, antiblock agents, dyes, pigments and other coloring agents, ultraviolet light absorbers and stabilizers, reinforcing agents, nucleators, plasticizers, lubricants, waxes, and combinations thereof.

In various embodiments, the composition includes a lubricant/wax. The lubricant may be any known in the art. In various embodiments, the lubricant is chosen from calcium stearate, sodium stearate, zinc stearate, lithium stearate, calcium montanate, ethylene bis stearamide, polyethylene wax, oxidized polyethylene, fatty acid amides, pentaerythritol tetrastearate, and combinations thereof.

If utilized, the additive is typically present in an amount of from about 0.1 to about 15, from about 0.05 to about 10, from about 0.01 to about 7.5, % by weight based on a total weight of the composition. In additional non-limiting embodiments, all values and ranges of values, both whole and fractional, within one or more of the aforementioned ranges, are hereby expressly contemplated. Further, it is to be appreciated that more than one type of additive may be included in the composition, in which case the total amount of all additives present in the composition is within the above ranges.

The composition may also include one or more fillers. The fillers are not particularly limited and may be any known in the art. For example, the composition may include a mineral filler, and/or carbon black. A mineral filler could, for example, be selected from wollastonite, clay, talc, mica, and combinations thereof. The particular type, size, etc. of the filler is not particularly limited and may be any known in the art.

If present, in many embodiments, the filler is present in the composition in an amount of from about 1 to about 95, from about 1 to about 80, from about 5 to about 60, from about 5 to about 45, or from about 10 to about 40, % by weight based on a total weight of the composition. In additional non-limiting embodiments, all values and ranges of values, both whole and fractional, within one or more of the aforementioned ranges, are hereby expressly contemplated. Further, it is to be appreciated that more than one type of filler may be included in the composition, in which case the total amount of all fillers present in the composition is within the above ranges.

Method of Forming a Heat-Resistant Polyamide Material

A method of forming the heat-resistant polyamide material with the composition includes the step of reacting the copolyamide (A) and the anhydride-functional polymer (B). In many embodiments, the step of reacting is further defined as the step of mixing, e.g. compounding, the composition comprising the copolyamide (A) and the anhydride-functional polymer (B) to form the heat-resistant polyamide material. The heat-resistant polyamide material has a low elastic modulus yet retains its elastic modulus and elongation properties after aging at an elevated temperature (e.g. aging for 3000 hours at 130° C.).

The step of compounding may occur through any method known in the art including, but not limited to, direct extrusion, belt extrusion, reaction extrusion, reaction injection molding, vertical mixing, horizontal mixing, feed mixing, and combinations thereof. In one embodiment, the step of compounding is further defined as combining the copolyamide (A) and the anhydride-functional polymer (B) in a twin-screw extruder. In one embodiment, the composition is compounded via twin-screw extrusion and subsequently formed via cast or blown film extrusion. Compounding the composition may cause all or some of the polyamide to react with the anhydride-functional polymer (B).

The method can optionally include the step of heating the composition during the step of compounding. That is, the composition including the copolyamide (A), the anhydride-functional polymer (B), and all other components can be heated while in the compounding device, outside of the compounding device, or both outside of the compounding device and in the compounding device.

The method may also include the step of pelletizing, dicing, or granulating, the heat-resistant polyamide material once it is compounded. For example, the heat-resistant polyamide material may be pelletized with an underwater pelletizer or a strand pelletizer.

The heat-resistant polyamide material has a tensile strength in the Z-direction of from 80 to 200 MPa as determined by EN ISO 527-1:2012. In other embodiments, the heat-resistant polyamide material has a tensile strength in the Z-direction of from about 90 to about 130, about 95 to about 125, about 100 to about 120, about 105 to about 115, or about 110 to about 115, MPa as determined by EN ISO 527-1:2012. In additional non-limiting embodiments, all values and ranges of values, both whole and fractional, including and within one or more of the aforementioned ranges, are hereby expressly contemplated.

As is demonstrated in the Examples, the heat-resistant polyamide material maintains greater than about 20, greater than about 30, greater than about 40, greater than about 45, greater than about 50, greater than about 55, greater than about 60, greater than about 70, greater than about 80, % of an initial elongation at break value when tested after aging for 500 hours at 150° C., with initial and aged elongation at break testing in accordance with EN ISO 527-1:2012.

The following examples are intended to illustrate the instant disclosure and are not to be viewed in any way as limiting to the scope of the instant disclosure.

EXAMPLES

Examples 1-7 are in accordance with the subject disclosure. The compositions of Examples 1-7 are set forth in Tables 1-3 below. Examples 1-7 include: (A) a copolyamide comprising the reaction product of (i) at least one lactam, and (ii) a monomer mixture (ii) comprising at least one $C_{32}$-$C_{40}$ dimer acid and at least one $C_4$-$C_{12}$-diamine; and (B) a maleic anhydride-functional polymer.

The compositions of Examples 1-7, including the copolyamide, the anhydride-functional polymer which is reactive with the polyamide, and the other components, e.g. heat stabilizing component, etc., are compounded with a twin screw extruder. Immediately following compounding/extrusion, the compositions cooled and pelletized. Once pelletized, the compositions are dried and molded into plaques in an injection molding machine. The polyamide and the anhydride-functional polymer react during compounding and molding to form a thermoplastic and the subsequent extrusion and heating processes to form an article.

Referring now to Table 1 below, the amount and type of each component included in Comparative Example 1 and Example 1 is set forth in % by weight based on a total weight of the composition (i.e., 100 parts by weight of each composition).

TABLE 1

| Compositions | | Comparative Example 1 | Example 1 |
|---|---|---|---|
| Polyamide 1 | wt % | 74.5 | — |
| Copolyamide 1 | wt % | — | 74.5 |
| Maleic Anhydride-functional Polymer 1 | wt % | 23.0 | 23.0 |
| Wax | wt % | 0.5 | 0.5 |
| Antioxidant | wt % | 0.5 | 0.5 |

TABLE 1-continued

| Compositions | | Comparative Example 1 | Example 1 |
|---|---|---|---|
| Carbon Black | wt % | 0.8 | 0.8 |
| Heat Stabilizer 1 | wt % | 0.7 | 0.7 |
| Total: | wt % | 100.0 | 100.0 |
| Tensile Testing, EN ISO 527-1:2012 (Dry as molded) | | | |
| E-modulus | MPa | 1392 | 962 |
| Stress at yield | MPa | 38.85 | 27.89 |
| Elongation at yield | % | 5.93 | 4.34 |
| Stress at break | MPa | — | 36.05 |
| Elongation at break | % | 204.86 | 139.06 |
| Charpy, EN ISO 179-1 (Dry as molded) | | | |
| Notched (23° C.) | Break Type | — | P* |
| strength | kJ/m2 | — | 113 |
| Heat Resistance, EN ISO 527-1:2012 (after 500 hours at 150° C.) | | | |
| E-modulus | MPa | 1336 | 1067 |
| Elongation at yield | % | 17.27 | 5.29 |
| Elongation at break | % | 44.02 | 78.82 |

*Partial break

Polyamide 1 is polyamide 6.10.

Copolyamide 1 is polyamide 6/6.36 comprising about 30% by weight 6.36 based on a total weight of Copolyamide 1.

Maleic Anhydride-functional Polymer 1 is a maleic anhydride modified ethylene-octene copolymer having a Melt Flow Rate (MFR) of 2.0 g/10 min (190° C., 2.16 kg) and a % by weight MAH of less than 1%.

Carbon Black is 30% by weight carbon black in polyethylene based on a total weight of the carbon black/polyethylene dispersion.

Heat Stabilizer 1 is a hindered amine.

Wax is zinc stearate.

Referring now to Table 1 above, Example 1 maintains about 56% of its elongation at break after aging for 500 hours at 150° C., while Comparative Example 1 only maintains about 21% if is elongation at break after aging for 500 hours at 150° C. As such, Example 1, which includes Copolyamide 1 and Maleic Anhydride-functional Polymer 1, demonstrates significantly better temperature stability than Comparative Example 1.

Referring now to Table 2 below, the amount and type of each component included in Comparative Examples 2 and 3 and Examples 2-4 is set forth in % by weight based on a total weight of the composition (i.e., 100 parts by weight of each composition).

TABLE 2

| | | Comparative Example 2 | Comparative Example 3 | Example 2 | Example 3 | Example 4 |
|---|---|---|---|---|---|---|
| Compositions | | | | | | |
| Polyamide 2 | wt % | 53.45 | — | — | — | — |
| Polyamide 3 | wt % | — | 58.45 | — | — | 58.45 |
| Copolyamide 2 | wt % | — | — | — | — | — |
| Copolyamide 1 | wt % | — | — | 58.45 | 78.45 | — |
| Maleic Anhydride-functional Polymer 2 | wt % | 30 | 30 | 20 | 20 | 20 |
| Ionomer | wt % | 10 | 10 | 20 | — | 20 |
| Plasticizer | wt % | 5 | — | — | — | — |
| Wax | wt % | 0.25 | 0.25 | 0.25 | 0.25 | 0.25 |
| Antioxidant | wt % | 1 | 1 | 1 | 1 | 1 |
| Heat Stabilizer 2 | wt % | 0.3 | 0.3 | 0.3 | 0.3 | 0.3 |
| Total: | wt % | 100 | 100 | 100 | 100 | 100 |
| Processing | | | | | | |
| MFR (275° C., 10 kg) | g/10 min | 3.51 | 0.21 | 3.339 | 2.658 | 2.784 |
| Std. dev. | | 0.17 | 0.034 | 0.378 | 0.314 | 0.314 |
| Tensile Test, EN ISO 527-1: 2012 (dry as molded) | | | | | | |
| E-modulus | MPa | 757 | 940 | 634 | 952 | 886 |
| Stress at yield | MPa | 39.86 | 26.63 | 21.32 | 28.34 | 25.54 |
| Elongation at yield | % | 105.31 | 6.36 | 6.64 | 4.91 | 5.38 |
| Stress at break | MPa | 37.25 | 38.53 | 40.23 | 36.33 | 43.03 |
| Elongation at break | % | 179.4 | 189.04 | 294.81 | 183.72 | 264.8 |
| Charpy, EN ISO 179-1 (dry as molded) | | | | | | |
| Notched (23° C.) Type break | | P | P | P | P | P |
| Tensile Strength | kJ/m2 | 149.2 | 131.5 | 134.6 | 78 | 136.7 |
| Heat resistance 130° C., EN ISO 527-1: 2012 | | | | | | |
| 500 hours | | | | | | |
| E-mod | MPa | 1082 | 958 | 725 | 1080 | 923 |
| Stress at yield | MPa | — | — | — | 29.14 | — |
| Elongation at yield | % | — | — | — | 5.12 | — |
| Stress at break | MPa | 33.99 | 38.28 | 34.6 | 34.92 | 38.96 |
| Elongation at break | % | 117.74 | 147.56 | 194.45 | 100.68 | 194.12 |
| 1000 hours | | | | | | |
| E-modulus | MPa | 1028 | 954 | 809 | 1150 | 933 |
| Stress at yield | MPa | — | — | — | 31.23 | — |
| Elongation at yield | % | — | — | — | 5.21 | — |

TABLE 2-continued

|  |  | Comparative Example 2 | Comparative Example 3 | Example 2 | Example 3 | Example 4 |
|---|---|---|---|---|---|---|
| Stress at break | MPa | 35.77 | 38.21 | 34.75 | 35.17 | 37.67 |
| Elongation at break | % | 130.21 | 141.95 | 192.6 | 82.85 | 165.07 |
| 2000 hours | | | | | | |
| E-modulus | MPa | 1078 | 983 | 778 | 1157 | 907 |
| Stress at yield | MPa | 35.11 | 34.29 | 32.79 | 31.57 | 35.22 |
| Elongation at yield | % | 55.78 | 62.36 | 104.94 | 5.53 | 104.68 |
| Stress at break | MPa | 9.62 | 28.8 | 32.36 | 34.12 | 35.35 |
| Elongation at break | % | 55.68 | 54.1 | 151.16 | 77.57 | 123.77 |
| 3000 hours | | | | | | |
| E-modulus | MPa | 1126 | 1008 | 794 | 1187 | 957 |
| Stress at yield | MPa | 32.52 | 32.12 | 29.36 | 36.15 | 33.11 |
| Elongation at yield | % | 14.4 | 23.68 | 97.24 | 50.4 | 92.13 |
| Stress at break | MPa | 3.79 | 28.66 | 28.65 | 32.88 | 31.88 |
| Elongation at break | % | 22.28 | 20.46 | 91.53 | 66.84 | 80.31 |
| Heat resistance at 150° C. (500 hours), EN ISO 527-1: 2012 | | | | | | |
| E-modulus | MPa | 1038 | 1001 | 1167 | 1215 | 1002 |
| Stress at yield | MPa | — | — | 30.61 | 31.22 | 34.94 |
| Elongation at yield | % | — | — | 4.85 | 4.8 | 104.67 |
| Stress at break | MPa | 33.14 | 32.82 | 34.59 | 34.15 | 33.86 |
| Elongation at break | % | 105.22 | 102.14 | 95.18 | 83.74 | 116.42 |

Polyamide 2 is polyamide 6.

Polyamide 3 is polyamide 6/66.

Copolyamide 2 is polyamide 6/6.36 comprising about 20% by weight 6.36 based on a total weight of Copolyamide 2.

Maleic Anhydride-functional Polymer 2 is a maleic anhydride modified ethylene-octene copolymer having an MFR of 1.6 g/10 min (190° C., 2.16 kg) and a % by weight MAH of less than 1%.

Ionomer is a zinc ionomer of ethylene methylacrylic acid copolymer (poly(ethylene-co-methacrylic acid)).

Plasticizer is N-n-Butylbenzenesulfonamide.

Heat Stabilizer 2 is a mixture of CuI/KI.

Referring now to Table 2 above, Comparative Examples 2 and 3 do not maintain an E-modulus below 1000 MPa upon aging at elevated while Examples 2 and 4 do. As such, Examples 2 and 4, which include Copolyamide 1 and Maleic Anhydride-functional Polymer 1, demonstrate significantly better temperature stability than Comparative Examples 2 and 3. Notably, Comparative Example 2 which includes polyamide 6, requires 5 wt. % plasticizer to obtain a low modulus with 30 wt. % Maleic Anhydride-functional Polymer 2 and 10 wt. % Ionomer. Further, Comparative Example 3 which includes polyamide 6/66, exhibits a low melt flow rate (i.e. the Examples exhibit better MFR than Comparative Example 3). Examples 2, 3 and 4 have a similar MFR compared to Comparative Example 2 without the addition of the plasticizer.

Referring now to Table 3 below, the amount and type of each component included in Comparative Examples 2 and 3 and Examples 5-7 is set forth in % by weight based on a total weight of the composition (i.e., 100 parts by weight of each composition).

TABLE 3

|  |  | Comparative Example 2 | Comparative Example 3 | Example 5 | Example 6 | Example 7 |
|---|---|---|---|---|---|---|
| Compositions | | | | | | |
| Polyamide 2 | wt % | 53.45 | — | 20 | 30 | — |
| Polyamide 3 | wt % | — | 58.45 | — | — | — |
| Polyamide 4 | wt % | — | — | — | — | 35 |
| Copolyamide 1 | wt % | — | — | 38.45 | 28.45 | 23.45 |
| Maleic Anhydride-functional Polymer 2 | wt % | 30 | 30 | 30 | 30 | 30 |
| Ionomer | wt % | 10 | 10 | 10 | 10 | 10 |
| Plasticizer | wt % | 5 | — | — | — | — |
| Wax | wt % | 0.25 | 0.25 | 0.25 | 0.25 | 0.25 |
| Antioxidant | wt % | 1 | 1 | 1 | 1 | 1 |
| Heat Stabilizer 2 | wt % | 0.3 | 0.3 | 0.3 | 0.3 | 0.3 |
| Total: | wt % | 100 | 100 | 100 | 100 | 100 |
| Processing | | | | | | |
| MFR (275° C., 10 kg) | g/10 min | 3.51 | 0.21 | 3.939 | 5.511 | 5.118 |
| Tensile Test EN ISO 527-1: 2012 (dry as molded) | | | | | | |
| E-mod | MPa | 757 | 940 | 717 | 811 | 669 |
| Stress at break | MPa | 37.25 | 38.53 | 31.97 | 32.68 | 31.54 |
| Elongation at break | % | 179.4 | 189.04 | 199.53 | 189.21 | 245.76 |

TABLE 3-continued

|  | | Comparative Example 2 | Comparative Example 3 | Example 5 | Example 6 | Example 7 |
|---|---|---|---|---|---|---|
| Charpy EN ISO 179-1 (dry as molded) | | | | | | |
| Notched (23° C.) Tensile Strength | Type break kJ/m2 | P 149.2 | P 131.5 | P 121.6 | P 125.9 | P 121.3 |
| Charpy EN ISO 179-1 (dry as molded) | | | | | | |
| Notched (0° C.) Tensile Strength | Type break kJ/m2 | P 135.9 | P 134.3 | P 128.2 | P 129.8 | P 122.3 |
| Charpy EN ISO 179-1 (dry as molded) | | | | | | |
| Notched (−40° C.) Tensile Strength | Type break kJ/m2 | P 133.1 | P 126.1 | P 127.1 | P 123 | P 118.8 |
| Tensile test EN ISO 527-1: 2012 1000 hours | | | | | | |
| E-mod | MPa | 1028 | 954 | 774 | 841 | 751 |
| Stress at break | MPa | 35.77 | 38.21 | 29.88 | 32.29 | 30.78 |
| Elongation at break | % | 130.21 | 141.95 | 116.59 | 124.44 | 184.2 |
| Tensile test EN ISO 527-1: 2012 2000 hours | | | | | | |
| E-mod | MPa | 1078 | 983 | 754 | 840 | 802 |
| Stress at break | MPa | 9.62 | 28.8 | 29.39 | 30.63 | 29.07 |
| Elongation at break | % | 55.68 | 54.1 | 113.36 | 100.35 | 163.54 |
| Tensile test EN ISO 527-1: 2012 3000 hours | | | | | | |
| E-mod | MPa | 1126 | 1008 | 758 | 853 | 804 |
| Stress at break | MPa | 3.79 | 28.66 | 27.04 | 29 | 24.55 |
| Elongation at break | % | 22.28 | 20.46 | 69.35 | 67.76 | 78.99 |
| Heat resistance at 150° C. (500 hours) Tensile test EN ISO 527-1: 2012 | | | | | | |
| E-mod | MPa | 1038 | 1001 | 809 | 882 | 814 |
| Stress at break | MPa | 33.14 | 32.82 | 28.76 | 29.81 | 27.29 |
| Elongation at break | % | 105.22 | 102.14 | 91.96 | 92.04 | 134.38 |

Polyamide 4 is polyamide 6.10.

Referring now to Table 3 above, Examples 5, 6, and 7 are formed with compositions comprising blends of Copolyamide 1 and other polyamides (e.g. polyamide 6 and polyamide 6.10). Examples 5 and 6 demonstrate significantly better temperature stability at 130° C. than Comparative Examples 2 and 3. Example 7 demonstrates significantly better temperature stability at 130° C. and 150° C. than Comparative Examples 2 and 3. Both the retention of the elongation at break and the stability of the E-modulus compared to the plasticized materials show the improvements.

It is to be understood that the appended claims are not limited to express any particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present disclosure, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The present disclosure has been described in an illustrative manner, and it is to be understood that the terminology which has been used is intended to be in the nature of words of description rather than of limitation. Obviously, many modifications and variations of the present disclosure are possible in light of the above teachings. It is, therefore, to be understood that within the scope of the appended claims, the present disclosure may be practiced otherwise than as specifically described.

What is claimed is:

1. A heat-resistant polyamide composition comprising:
   A. a copolyamide comprising the reaction product of:
      (i) 40 to 80% by weight of at least one lactam, and
      (ii) 20 to 40% by weight of a monomer mixture comprising:
         at least one $C_{32}$-$C_{40}$ dimer acid,
         at least one $C_4$-$C_{12}$-diamine; and
         at least one $C_4$-$C_{20}$ diacid, and
   B. an anhydride-functional polymer,
   wherein the % by weight of components (i) and (ii) is based on the total weight of components (i) and (ii) in said composition, and
   the anhydride-functional polymer (B) is a maleic anhydride modified ethylene-octene copolymer.

2. A composition as set forth in claim 1 wherein said at least one lactam is a $C_4$-$C_{12}$ lactam.

3. A composition as set forth in claim 1 wherein said at least one lactam is selected from δ-lactam, ε-lactam, and combinations thereof.

4. A composition as set forth in claim 1 wherein said $C_{32}$-$C_{40}$-dimer acid is prepared from an unsaturated $C_{18}$ fatty acid.

5. A composition as set forth in claim 4 wherein said unsaturated $C_{18}$ fatty acid is selected from petroselic acid, oleic acid, elaidic acid, vaccenic acid, linoleic acid, and combinations thereof.

6. A composition as set forth in claim 1 wherein said $C_4$-$C_{12}$-diamine is selected from tetramethylenediamine, pentamethylenediamine, hexamethylenediamine, decamethylenediamine, dodecamethylenediamine, and combinations thereof.

7. A composition as set forth in claim 1 wherein said copolyamide is further defined as a copolyamide of polyamide 6 and polyamide 6.36.

8. A composition as set forth in claim 7 wherein said polyamide 6.36 is present in said copolyamide in an amount of from about 8 to about 45% by weight based on a total weight of said copolyamide.

9. A composition as set forth in claim 1 wherein said copolyamide is present in an amount of from about 45 to about 95% by weight based on a total weight of said composition.

10. A composition as set forth in claim 1 wherein said anhydride-functional polymer has a linear molecular structure.

11. A composition as set forth in claim 1 wherein maleic anhydride is present in said anhydride-functional polymer in an amount of from about 0.2 to about 50% by weight based on a total weight of said anhydride-functional polymer.

12. A composition as set forth in claim 1 wherein said anhydride-functional polymer is present in an amount of from about 5 to about 60% by weight based on a total weight of said composition.

13. A composition as set forth in claim 1 comprising a heat stabilizing component comprising at least one of a metal salt, a carbon black, and a hindered amine.

14. A composition as set forth in claim 13 wherein said heat stabilizing component is present in an amount of from about 0.1 to about 4% by weight based on a total weight of said composition.

15. A heat-resistant polyamide material comprising the reaction product of said copolyamide (A) and said anhydride-functional polymer (B) as set forth in claim 1.

16. A heat-resistant polyamide material as set forth in claim 15 which maintains greater than about 50% of an initial elongation at break value when tested after aging for 500 hours at 150° C., with initial and aged elongation at break testing in accordance with EN ISO 527-1:2012.

* * * * *